Oct. 4, 1966  TARO YAMAGUCHI  3,276,074
APPARATUS FOR SHAPING POWDERS INTO FLAKES OR THE LIKE
Filed Sept. 18, 1964  4 Sheets-Sheet 1

United States Patent Office 3,276,074
Patented Oct. 4, 1966

3,276,074
APPARATUS FOR SHAPING POWDERS INTO FLAKES OR THE LIKE
Taro Yamaguchi, Tokyo, Japan, assignor to Onoda Cement Company, Limited, Onoda, Japan
Filed Sept. 18, 1964, Ser. No. 397,545
4 Claims. (Cl. 18—9)

This invention relates to an apparatus for shaping powdered materials such as quick lime, cement raw mixture, slaked lime, soda ash, rouge, etc. into flakes or other desired shapes.

Upon shaping a powdered material into flakes or any other desired shape by any of the conventional type of shaping apparatus including a pair of shaping rolls, gaseous mediums such as air and/or water vapor arrested among the particles of the materials prevented not only a compacting force between the rolls from effectively exerting upon the portion of the material disposed between the rolls, but also leaving the rolls, the formed products were cracked due to the expansion of those gaseous mediums, with the result that the formed products were brittle, leading to the impossibility of fully attaining the purpose of shaping the powdered material into the desired shape. Therefore there have been previously proposed various methods of shaping powdered materials under high pressures into desired shapes in order to prevent the resulting shaped products from becoming brittle or fragile. To this end, there have been generally used the piston and ring roll types of apparatus capable of shaping powdered materials under high pressure into desired shapes. However, such apparatuses are relatively high in cost of equipment as compared with their productivity and also high in cost of operation, resulting in an increase in manufacturing cost which is not desirable.

An object of this invention is, accordingly, to provide an improved apparatus for shaping powdered materials into any desired shape with a high degree of efficiency and at low cost.

Another object of this invention is to provide an improved apparatus for shaping powdered materials, for example, into flakes, having high strength.

According to this invention, there is provided an apparatus for shaping a powdered material into a desired shape, comprising a hopper for accommodating a powdered material to be formed or shaped, at least one vibrator unit resiliently mounted to the hopper including at least one vibrating or vibrator plate substantially vertically disposed within the hopper and vibration device disposed outside the hopper and operatively connected to each of the vibrating plates, and at least one pair of shaping rolls disposed on an opening at the lower end of the hopper, each pair of shaping rolls resiliently contacting each other and being capable of rotating symmetrically and synchronously.

Preferably, the vibrator unit may include a plurality of vibrating plates, the central one of which is disposed directly above a contact or nip line between the shaping rolls with the lower edge substantially parallel to that line and the other plates are disposed substantially parallel to each other and symmetrically with respect to the central plate.

Advantageously, at least one of the vibrating plates may provide a part of the outer wall of the hopper.

Also a spacing between two adjacent vibrating plates or between the vibrating plate and the adjacent outer wall of the hopper may be increased from its upper portion to its lower end.

Conveniently, the vibrator unit may be supported by a cable or wire coupled to the hopper or to a cross member connected to the same adjacent the upper end.

The invention will become more readily apparent from the following detailed description taken in conjunction with the accompanying drawings in which.

Figure 1:
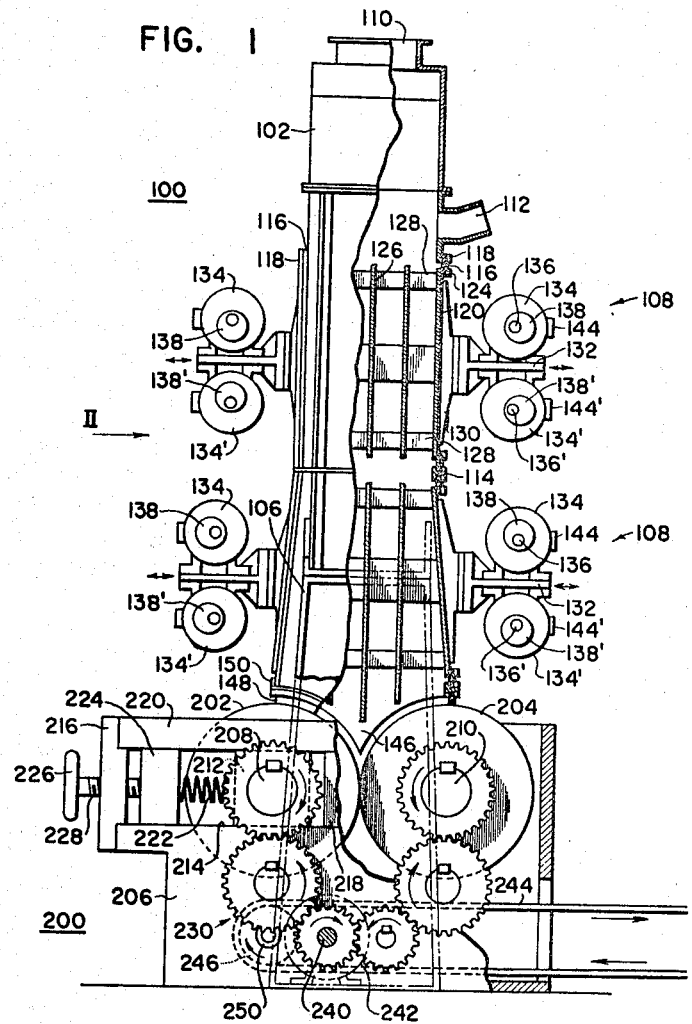
FIG. 1 shows a side elevational view of an apparatus constructed in accordance with the teachings of the invention with parts cut away for the purpose of clearly illustrating the interior thereof.
Figure 2:
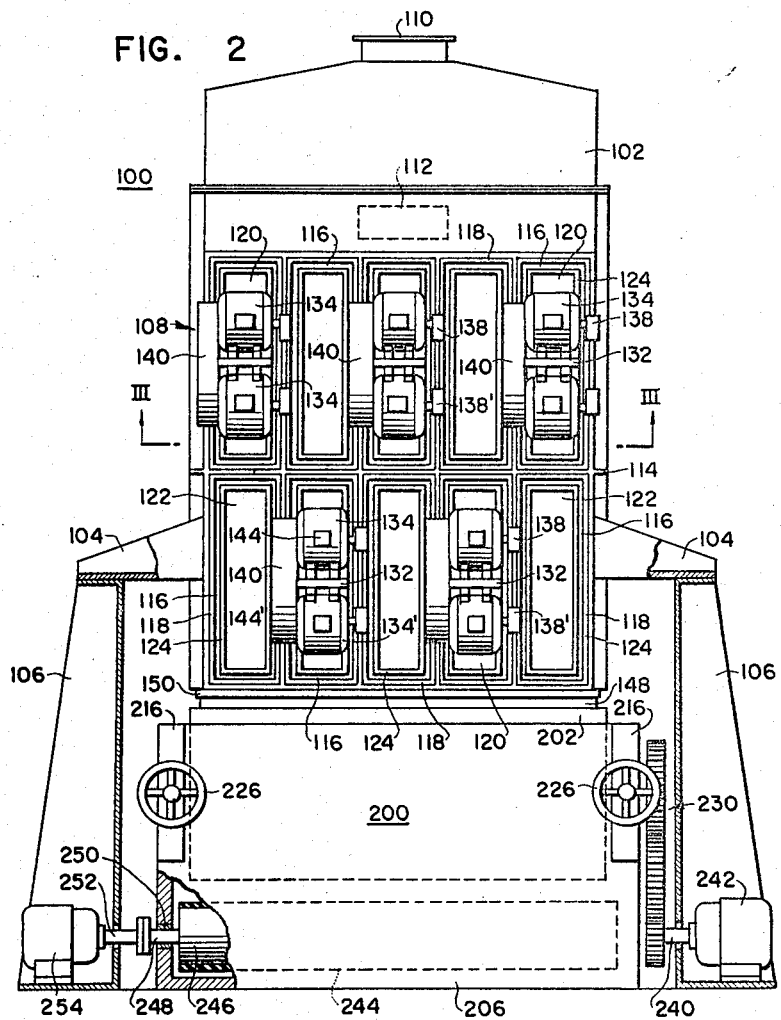
FIG. 2 shows a side elevational view of the apparatus shown in FIG. 1 as viewed in the direction of the arrow II of FIG. 1.

Referring now to FIGS. 1 and 2 of the drawings, there is illustrated one embodiment of the invention. The embodiment illustrated consists of two main structures or a degassing vibrator device generally designated at the reference numeral 100 and a shaping device generally designated at the reference numeral 200. Both devices are rigidly secured on a firm foundation made, for example, of concrete.

The vibrator device 100 comprises a hopper 102 which may be made of any suitable sheet steel and rigidly secured through a pair of brackets 104 to a pair of base members 106 and a plurality of vibrator units 108 (see FIGS. 1 through 4) mounted to the hopper for vibrational movement relative to the hopper.

The hopper 102 is provided at the upper end with an inlet port 110 through which a powdered material to be formed or shaped can be fed into the hopper from a pneumatic conveyor or bucket conveyor (not shown). The hopper 102 is also provided on the portion of the side wall positioned at a level somewhat lower than that of the inlet port 110 with a vent port 112 through which any gaseous medium such as air initially arrested among the particles of the powdered material and removed from the same by the operation of the vibrator unit as described hereinafter is exhausted externally of the apparatus. The hopper 102 includes its downward extension disposed below the vent port 112 and providing a space, within which the powdered material charged into the hopper 102 is temporarily accumulated until the same is fed into the shaping device 200.

Disposed on the opposed side surfaces of the hopper 102 sandwiching the space just described are a pair of grid structures 114 which may be made of any suitable shape steel and provide a plurality of divided rectangular compartments (see FIG. 1). The vibrator units 108 are resiliently supported to the grid structures of the hopper 102 within these compartments by support members 116 of resilient material such as rubber. The support member 116 may be in the form of a rectangular frame. More specifically, each of the resilient support members 116 is hermetically mounted to the associated grid structure 114 of the hopper 102 by a retainer 124 made by welding pieces of any suitable flat steel into rectangular frame and bolts (not shown) and also to a pair of outer wall plates 120 and 122 of the vibrator unit 108 by a retainer 118 made by welding pieces of any suitable flat steel into a rectangular frame and bolts (not shown). The plates 120 and 122 are disposed in substantially parallel relationship and in this case, form parts of the outer wall of the hopper 102.

In FIG. 2, the ten vibrator units 108 are shown as being arranged such that each of a pair of horizontal rows includes five units. However it is to be understood that the total number of the vibrator units, the number of the horizontal rows and the number of the units included in each row are properly selected dependent upon the volume of that portion of the hopper extending downwardly from the vent port 112 and a vibrational force generated by each unit. Therefore a single vibrator unit may give the satisfactory results. Alternatively a single horizontal row or more than two rows may be required for the satisfactory results.

It has been found that that portion of the hopper 102 extending downwardly from the vent port 112 should have its length or height sufficient to degas the powdered material while the same charged and accumulated in the hopper is moved into the spaces between vibrating plates involving the outer wall plates 120 and 122 of the hopper 102 and also to cause the degassed material to enter into a space between a pair of shaping rolls in the shaping device 200 due to its weight thereby to begin to be shaped into a predetermined shape. While the height of the hopper extension depends upon the type and particle size of a powdered material to be shaped and the other factors, it has been found that even for any material such as a cement raw mixture, quick lime or the like which is difficult to be shaped is required only to be above 40 inches and preferably range from 48 to 120 inches.

The vibrator unit 108 will now be described in conjunction with FIGS. 1, 3 and 4. As best shown in FIG. 4, the vibrator unit 108 comprises a plurality of rectangular vibrating plates 126 disposed in parallel relationship in the vertical spaced planes and plural pairs connecting strips 128 horizontally disposed at intervals to connect the vibrating plates 126.

The connecting strip has preferably its main faces vertically disposed. A pair of the outermost opposed plates serves as outer wall plates 120 and 122 of the vibrator unit. The plates and the strips are preferably made of a sheet steel. While the numbers of the vibrating and connecting plates 126 and 128 respectively are shown as being three different numbers may be used if desired.

Figure 3:
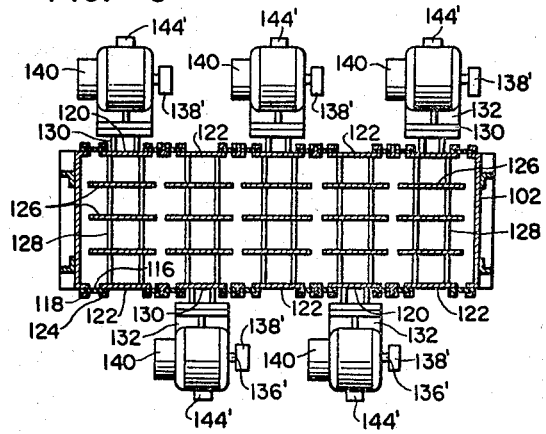
FIG. 3 shows a section taken along the line III—III of FIG. 2.
Figure 4:
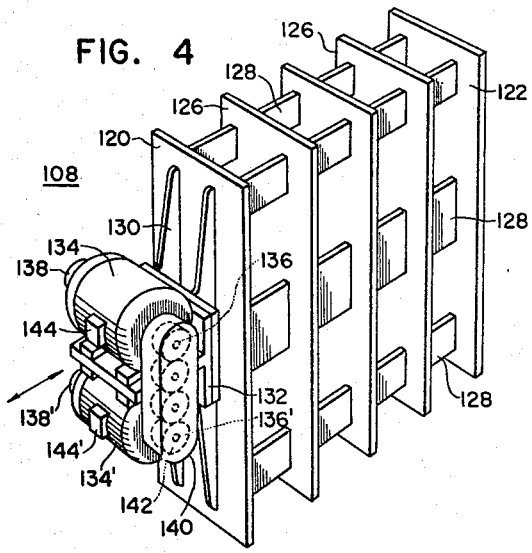
FIG. 4 shows a perspective view of a vibrator unit suitable for use in the apparatus illustrated in FIGS. 1 and 2.

As shown in FIGS. 3 and 4, one of the outer wall plates 120 has secured thereto pedestal 130 serving as reinforcing members. Rigidly secured to the pedestal 130 is a bracket 132 having a T-shaped cross-section, on which a twin rotary vibration device is mounted. This device consists of two identical sections. Therefore only one of the sections is fully described and the corresponding parts in the other section are designated at the same reference numerals primed. The one section includes an electric motor 134 rigidly secured to the bracket 132 and having its rotor shaft 136 provided at one end with a weight 138 whose center of gravity is eccentric. Both the rotor shafts 136 and 136' are provided at the other ends with a gear box in which a train of gears 142 is disposed. The train of gears 142 has an even number of gears in this case four gears and serves to rotate the shafts 136 and 138' synchronously and to maintain always the weights 138 and 138' in symmetrical phase relationship. Each of the motors 134 or 134' is connected to a source of electric power (not shown) through the associated terminal box 144 or 144' and a lead (not shown).

If the vibration device is subject to a limitation as to its space which the device occupies, then the alternate ones of the motors may dispose on one side of thte array of the vibrator units while the remaining motors are disposed on the other side thereof as shown in FIG. 3. This arrangement is advantageous because it gives good effects on the distribution of weight of the hopper 102 and hence its mechanical strength saves the required amounts of materials for the hopper.

With the arrangement of the vibration device as above described it will be appreciated that, in operation, the pair of eccentric weights 138 and 138' effect vibrational movement of the associated group of the vibrating plates 120–122–126 only in the direction of the arrow illustrated in FIGS. 1 and 4, that is, in the direction normal or substantially normal to the plane of each vibrating plate but not in any other direction because the vibration of one of the weights offsets that of the other weight in such a direction.

Since the spacing between any pair of the adjacent vibrating plates depends upon the physical properties of a powdered material to be shaped, the amplitude and frequency of vibration involved, and a direction in which the vibration is effected, the same is difficult to be unconditionally determined. It is, however, preferred that, in order to increase the useful life of the resilient support member 116, the amplitude of vibration is as small as possible and that the number of the vibrating plates is increased to permit any gaseous medium arrested among the particles of the powdered material to be satisfactorily degassed. As an example, a cement raw mixture passed through a screen having a size of 88 microns was effectively shaped with vibration devices such as above described, vibrated with an amplitude of $3/64$ of an inch at a frequency of 3600 cycles per minute and in a direction normal to the plane of each vibrating plate when the spacing between two adjacent plates is ranged from 4 inches to 8 inches.

In FIG. 1 it is noted that the vibrating plates of each unit in the upper row are disposed in substantially parallel relationship whereas the opposed outer wall plates of the lower row are disposed such that the spacing therebetween is increased from the upper end to the lower end thereof. This measure facilitates falling movement of the denser powdered material as it moves downwardly.

As shown in FIG. 1, the lowermost edge of the hopper 102 is separated away from the outer peripheries of a pair of shaping rolls 202 and 204 by a substantially fixed small distance. The rolls 202 and 204 resiliently contact each other and serve to shape a powdered material dropping in therebetween, into a predetermined shape dependent upon the configuration of the peripheral surface of each roll. The portion of the lowermost edge of the hopper positioned between the pair of shaping rolls is shaped into skirting of wedge-shape whose apex is directly above the contact line between the rolls. In order to prevent the powdered material from escaping externally from the apparatus through a clearance between the lowermost edge of the hopper 102 and the pair of shaping rolls 202 and 204, the hopper is provided on that edge with a slidable packing 148 mounted thereto through a retainer 150 made of a flat steel and bolts (not shown). The packing 148 may be preferably made of rubber.

It has been found that, for the satisfactory results, a selected one and preferably the central one of the vibrating plates of each vibration unit as previously described should have its lower edge disposed directly above the contact line between the shaping rolls at a distance of from approximately 4 to 12 inches measured therefrom while the remaining plates of each unit are disposed at intervals approximately corresponding to from 1 to 6 inches and symmetrically with respect to the selected or central plate.

Both shaping rolls 202 and 204 are carried on a bearing support 206 by having the respective rotatory shafts 208 and 210 in bearings on the support. More specifically, one of the shafts, for example, the shaft 210 may be journalled in the conventional bearings such as metallic bearings with an oil immersed or roller bearings whereas the other shaft 208 is movably journalled in bearings of special design similar to an automatically centering type permitting a nip pressure between the rolls to be adjusted to a value required for shaping the particular powdered material into a predetermined shape. The rotatory shaft 208 is shown here as being journalled by a pair of bearing blocks 212 each slidably sandwiched between the upper surface 214 at either side of the bearing support 206 and a guiding member 220 mounted in spaced parallel relationship to the bearing support through a spacer 216 or 218. Then each of the bearing supports 206 and 220 is normally biased to push against the roll 204 by the action of a compression spring 222 through a guiding member 224. In order to manually control the nip pressure between the rolls 202 and 204, a manually operated handle 226 is provided for driving a screw-threaded rod 228 secured to the same and threaded into a screw-threaded hole extending through the spacer 216. The driving of the screw-threaded rod 228 causes movement of the guiding member 224 thereby to adjust the nip pressure between the shaping rolls.

The pair of shaping rolls 202 and 204 are of the same diameter for the purpose of rotating the same at a common circumferential speed. Further both rolls should be rotated symmetrically or in the opposite directions respectively. To this end, the shaft 208 of the one roll 202 interlocks with the shaft 210 of the other roll 204 through a train of gears 230 including even number of gears. A selected one of the gears is operatively coupled to a rotatory shaft 240 for a geared motor or the like illustrated as an electric motor with a reduction gearing 242 mounted on the foundation 106. With this arrangement the shaping rolls and the gears are adapted to be rotated in the respective directions of the arrows designated near the associated components in FIG. 1.

Disposed below both shaping rolls 202 and 204 is an endless belt conveyor 244 for delivering the shaped products discharged from the space between the rolls. To drive the endless belt conveyor 244, a conveyor drum 246 is mounted at both ends on a rotatory shaft 248 carried by a pair of bearings 250 disposed in the bearing support 206. The rotatory shaft 248 may be, for example, coupled to a rotatory shaft 252 of a geared motor such as an electric motor 254 with reduction gearing to drive the endless belt conveyor 244 in the direction of the arrow illustrated in FIG. 1.

The arrangement thus far described is operated as follows:

It is assumed that a powdered material to be shaped, such as quick lime, cement raw mixture, slaked lime, rouge, starches or the like is being fed into the hopper 102 through the inlet port 110 while the motor 134 and 134' for driving the vibrating devices is put in charged state. The group of vibrating plates 126 of each unit involving the outer wall plates 120 and 122 are vibrated in a direction normal to the plane of each plate for each vibrator unit. This vibration movement of the vibrating plates causes vibrational movement of the particles of the powdered material progressively accumulated between the adjacent plates vibrating to expel gaseous medium such as air and/or water vapor arrested among the particles. The gaseous medium thus expelled will move upwardly in the reverse direction from the direction in which the powdered material is lowered due to its weight until it is exhausted from the hopper 102 through the vent port 112.

After the powdered mass accumulated within the hopper by continuously feeding the powdered material has its upper surface reaching immediately below the vent port 112 or the upper edges of the vibrating plates of the vibrator unith 108 in the upper row, the motors 242 and 254 can now be charged to drive the shaping rolls. As a result, that portion of the powdered material sufficiently degassed and positioned within the lower portion of the hopper 102 enters successively the space between the both shaping rolls synchronously rotating at common low rate due to both its weight and the friction between the powder material contacting the rolls and the latter rolls. Then the powdered mass is compressed and shaped into a predetermined shape and thereafter the shaped products leave the rolls and drop upon the endless belt conveyor 244. The shaped products on the conveyor are carried away for the subsequent treatment.

It is to be noted that the minimum speed of the conveyor 244 at which it can deliver the shaped products should be such that, even if the shaped products would be accumulated onto the conveyor 244, the conveyor can be moved sufficiently not to prevent the succeeding shaped products from discharging the same. Also, it is essential that, during the continuous shaping of the powdered material into a predetermined shape the same should be fed into the hopper such that the layer of the powdered material accumulated within the hopper should have its upper surface always reaching the vibration plate of the vibrator units in the upper row. This measure permits the powdered material to be sufficiently degassed before it enters the space between the shaping rolls.

The results of experiments conducted with various powdered material by using the present apparatus are listed in the following Table I.

*Table I*

| Type of sample | Density of sample prior to charging in hopper $D_1$ in lb./in.$^3$ | Density of sample at lower end of hopper $D_2$ in lb./in.$^3$ | Ratio of densities $D_2/D_1$ |
| --- | --- | --- | --- |
| Cement raw mixture | 0.029 | 0.043 | 1.5 |
| Slaked lime | 0.021 | 0.032 | 1.5 |
| Soda ash | 0.021 | 0.032 | 1.5 |
| Rouge | 0.036 | 0.058 | 1.6 |
| Starch | 0.014 | 0.021 | 1.4 |

Any degassed powdered material as illustrated in Table I can readily be compacted between the two shaping rolls. For example, a cement raw mixture presently considered as being difficult to be shaped could be shaped to a density of 0.07 pound per cubic inch by using the abovementioned apparatus including a pair of rolls having the smooth cylindrical surfaces with the compression pressure between the rolls having a value of 14,000 pounds per square inch.

It will readily be appreciated that, upon shaping a powdered material between a pair of rolls having smooth cylindrical surfaces, the shaped product in the shape of a pendent flat sheet leaves the rolls. However, the shaped product in this shape is broken into relatively large flake due to the action of the moving conveyor 244 and then is carried out by the same. It is noted that the handle 226 can be operated to vary the compression pressure between the shaping rolls thereby to control both the relative magnitudes of the thickness and density of the shaped product.

If it is desired to form a powdered material into grains, pellets, briquets or any other desired shape then each of the shaping rolls may be provided on the peripheral surface with a multiplicity of recesses being complemental to the desired shape. Then the recesses on the one roll are arranged to register the corresponding recesses on the other roll in the region of the space between the rolls.

Figure 5:
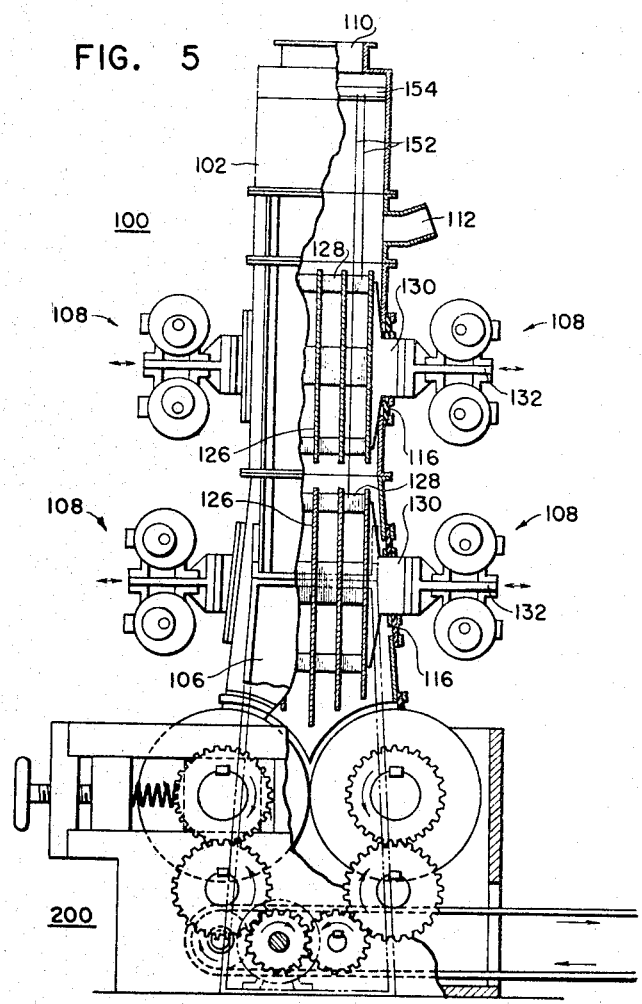
FIG. 5 shows a view similar to FIG. 1 but illustrating a modification of the invention.

Referring now to FIG. 5 of the drawings, wherein like reference numerals designate the components similar or corresponding to those shown in FIGS. 1 through 4, there is illustrated another embodiment of the invention wherein all vibrating plates are disposed within a hopper and include no outer wall plate of the hopper. An arrangement illustrated comprises a plurality of vibrator units 108 secured to the respective pedestals 130 through support members of any suitable resilient material such as rubber, the pedestals being mounted to a hopper 102. In order to necessarily maintain the vibrating plates in their substantially vertical position, each of the vibrator unit 108 may be advantageously suspended by a cable or rope 152 operatively coupled to a common cross beam 154 disposed adjacent the upper end of the hopper 102. The cross beam 154 may be of an angle steel. The combination of the cable 152 and cross beam 154 does not interfere with the powdered material being charged into the hopper. The other respects are basically identical with the embodiment shown in FIGS. 1 through 4.

While the invention has been shown and described in conjunction with the certain preferred embodiments thereof it is to be understood that various changes in the detail of construction and the arrangement and combination of parts may be made without departing from the spirit and scope of the invention. For example, instead of the so-called twin type rotary vibrator device, a rotary vibration device including a single eccentric weight, an electromagnetic vibration device, a differential electromagnetic vibration device including an armature capable of reciprocating between at least two solenoids, and a device including vibrating plates adapted to be vibrated by crank movement may be used separately or in any combination.

What I claim is:

1. An apparatus for shaping a powdered material into a predetermined shape, comprising hopper means, at least one vibrator plate operatively coupled to said hopper means, at least one vibrator unit resiliently mounted to said hopper means, a resilient member resiliently mounting said vibrator unit on said hopper means, said vibrator unit including said vibrator plate and a vibration device disposed externally of said hopper means and operatively connected to said vibrator plate, suspension means having one end coupled to said hopper means and connected to suspend said vibrator unit from said hopper means, at least one pair of shaping rolls disposed in an opening at the lower end of said hopper means, said hopper means having a lowermost edge, said lowermost edge of said hopper means being separated away from the outer peripheries of said pair of shaping rolls by a substantially uniform small distance, said pair of shaping rolls resiliently contacting each other to define a nip, and power means for driving said pair of shaping rolls symmetrically and synchronously, the arrangement being such that a powdered material to be shaped is charged into said hopper means where the same is vibrated by the vibrational movement of the vibrator plate and thereafter drops in a space between said shaping rolls where the same is formed in the predetermined shape.

2. An apparatus according to claim 1, in which said vibrator unit is disposed defining a space within said hopper means and comprises outer plates diverging outwardly at a lower end of said unit, thereby to allow easier passage of said powdered material downwardly to said shaping rolls.

3. An apparatus for shaping a powdered material into a predetermined shape, comprising hopper means, a plurality of vibrator plates operatively coupled to said hopper means, at least one vibration unit resiliently mounted of said hopper means, a resilient member resiliently mounting said vibrator unit on said hopper means, said vibrator unit including said plurality of vibrator plates and a vibration device disposed externally of said hopper means and operatively connected to said plurality of vibrator plates, suspension means having one end coupled to said hopper means and connected to suspend said vibrator unit from said hopper means, at least one pair of shaping rolls disposed in an opening at the lower end of said hopper means, said pair of shaping rolls resiliently contacting each other, said hopper means having a lowermost edge, said lowermost edge of said hopper means being separated away from the outer peripheries of said pair of shaping rolls by a substantially uniform small distance, a central one of said vibrator plates being disposed so as to have its lower edge positioned directly above the contact line between said shaping rolls and substantially parallel to the same, and the remaining vibrator plates being disposed parallel to each other and symmetrically with respect to said central plate, the arrangement being such that a powdered material to be shaped is charged into said hopper means where the same is vibrated by the vibrational movement of the vibrator plates and thereafter drops in a space between said shaping rolls where the same is formed in the predetermined shape.

4. An apparatus according to claim 3, wherein a plurality of said vibrator plates is provided, said plurality of vibrator plates being disposed in substantially parallel relationship, and a plurality of strips disposed transversely of said vibrator plates connecting said vibrator plates.

References Cited by the Examiner

UNITED STATES PATENTS

| 1,842,232 | 1/1932 | Baker. | |
|---|---|---|---|
| 2,101,031 | 12/1937 | Little | 259—1 |
| 2,675,304 | 4/1954 | Komarek | 18—9 XR |
| 3,037,242 | 6/1962 | Endier | 18—9 |
| 3,060,502 | 10/1962 | Snyder | 18—9 |

FOREIGN PATENTS

| 245,560 | 5/1963 | Australia. |
|---|---|---|
| 524,140 | 10/1954 | Belgium. |
| 941,401 | 7/1949 | Germany. |
| 1,142,484 | 9/1957 | France. |

WILLIAM J. STEPHENSON, *Primary Examiner.*